(12) United States Patent
Ulrich et al.

(10) Patent No.: US 10,427,237 B2
(45) Date of Patent: Oct. 1, 2019

(54) METHODS AND APPARATUS TO CONTROL A WELD CURRENT AMPERAGE

(71) Applicant: Illinois Tool Works, Glenview, IL (US)

(72) Inventors: James F. Ulrich, Appleton, WI (US); Bruce A. Casner, Neenah, WI (US); Zakary Stapp, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 320 days.

(21) Appl. No.: 15/040,632

(22) Filed: Feb. 10, 2016

(65) Prior Publication Data

US 2017/0225254 A1     Aug. 10, 2017

(51) Int. Cl.
    *B23K 9/095*     (2006.01)

(52) U.S. Cl.
    CPC .......... *B23K 9/0953* (2013.01); *B23K 9/0956* (2013.01)

(58) Field of Classification Search
    CPC .. B23K 9/0953; B23K 9/0956; B23K 9/0732; G05B 2219/45135
    USPC ...................................................... 219/130.31
    See application file for complete search history.

(56) References Cited

U.S. PATENT DOCUMENTS

| | | | |
|---|---|---|---|
| 5,864,116 A | 1/1999 | Baker | |
| 6,034,350 A | 3/2000 | Heraly et al. | |
| 6,930,280 B2 | 8/2005 | Zauner et al. | |
| 2006/0061337 A1* | 3/2006 | Kim | G05F 1/70 323/205 |
| 2012/0223063 A1* | 9/2012 | Tanaka | B23K 9/073 219/130.01 |
| 2012/0303175 A1* | 11/2012 | Lambert | B23K 9/0953 700/298 |
| 2014/0210370 A1* | 7/2014 | Pawellek | H05B 41/2828 315/224 |

FOREIGN PATENT DOCUMENTS

EP     1604767     12/2005

OTHER PUBLICATIONS

Welding Design & Fabrication, Thread: Arc Force??, Jun. 12, 2012, http://weldingweb.com/showthread.php?105621-Arc-force. (5 pages).

(Continued)

*Primary Examiner* — Dana Ross
*Assistant Examiner* — Joe E Mills, Jr.
(74) *Attorney, Agent, or Firm* — McAndrews, Held & Malloy, Ltd.

(57) ABSTRACT

Methods and apparatus to control a weld current amperage are disclosed. A disclosed example method includes identifying an amperage parameter of a welding device, determining a voltage set point based on the amperage parameter and a voltage correction factor, outputting weld current based on the amperage parameter and the voltage set point, comparing a measured voltage corresponding to the weld current to a threshold, and when the measured voltage satisfies the threshold, and adjusting an amperage of the weld current based on the amperage parameter, the voltage set point, and the measured voltage using a first amperage-voltage relationship.

22 Claims, 4 Drawing Sheets

(56) References Cited

OTHER PUBLICATIONS

Weld Talk Message Boards, "Cutting with stick welder??," May 22, 2008, http://www.hobartwelders.com/weldtalk/archive/index.php/t-4793.html. (6 pages).
Weld Talk Message Boards, "Arc Force/Dig/Variable VA Curves on engine drives," Feb. 17, 2007, http://hobartwelders.com/weldtalk/archive/index.php/t-23774.html. (8 pages).
MillerWelds.com, Owner's Manual, XMT 304 CC/CV (400 Volts Models) CE, Jan. 2015 (40 pages).
Extended European Search Report for Appln No. 16207451.2-1702 dated Jun. 30, 2017 (6 pages).

* cited by examiner

METHODS AND APPARATUS TO CONTROL A WELD CURRENT AMPERAGE

BACKGROUND

The invention relates generally to welding systems, and more particularly to welding systems used for gouging. In welding, gouging typically refers to the process of using an electrode to remove metal from a workpiece, a prior weld, or a weldment. One such method is air carbon arc gouging, in which an air blast is used to remove molten metal that has been melted via an arc.

SUMMARY

Methods and apparatus to control a weld current amperage, substantially as illustrated by and described in connection with at least one of the figures, as set forth more completely in the claims.

DETAILED DESCRIPTION

Some power supplies that are capable of performing stick welding include a "Dig" or "Arc Force" function that involves increasing the current when the welding voltage dips below a certain level. Conventionally, such a voltage level is 16V-18V. Below this voltage level, current is added at a rate of about 20 amps (A) per volt (V) to reduce the likelihood of the electrode sticking to the workpiece. Disclosed examples include a welding power supply that uses an amperage-voltage curve defined so that the welder is consistently operating in an amperage-adjusted mode. In some examples, a welding power supply provides energy for gouging that consistently operates in an amperage-adjusted mode. Disclosed examples enable a substantially easier and more consistent gouging performance, even for relatively inexperienced weld operators. Additionally, disclosed examples substantially reduce the likelihood that an operator will "stub out," or short the gouging electrode to the workpiece.

Disclosed example methods to provide a controlled current to an electrode include identifying an amperage parameter of a welding device, determining a voltage set point based on the amperage parameter and a voltage correction factor, and outputting, with a power conversion circuit, electrical energy to support an electrical arc based on the amperage parameter and the voltage set point. Disclosed example methods also include comparing a measured voltage of the arc to a threshold and, when the measured voltage satisfies the threshold, adjusting an amperage of the electrical arc based on the amperage parameter, the voltage set point, and the measured voltage using a first amperage-voltage relationship.

Some example methods further include, when the measured voltage does not satisfy the threshold, setting the amperage of the electrical arc based on the amperage parameter, the voltage set point, and a second amperage-voltage relationship. In some examples, the threshold is a higher voltage than the voltage set point. In some example methods, the adjusting of the amperage of the electrical arc includes causing the amperage to be greater than or equal to the amperage parameter while the electrical arc is present.

In some examples, identifying the amperage parameter includes receiving the amperage parameter from at least one of a user interface or a communications interface. In some example methods, the voltage correction factor comprises an amperage-voltage curve.

Disclosed example welding devices provide a controlled current to an electrode, and include an interface, a voltage set point calculator, an arc voltage monitor, a power converter, and an amperage adjuster. The interface receives an amperage parameter. The voltage set point calculator sets a voltage set point based on the amperage parameter and a voltage correction factor. The arc voltage monitor compares a measured voltage of a weld arc to a threshold. The power converter outputs electrical energy to support an electrical arc based on the amperage parameter and the voltage set point. When the measured voltage satisfies the threshold, the amperage adjuster adjusts an amperage of the weld arc based on the amperage parameter, the voltage set point, and the measured voltage using a first amperage-voltage relationship. The voltage set point calculator may use additional information, such as electrode diameter, if such information is available to the voltage set point calculator.

In some example welding devices, when the measured voltage does not satisfy the threshold, the amperage adjuster adjusts the amperage of the weld arc based on the amperage parameter, the voltage set point, and a second amperage-voltage relationship. In some examples, the amperage adjuster accesses a first portion of an amperage-voltage curve to use the first amperage-voltage relationship and access a second portion of the amperage-voltage curve to use the second amperage-voltage relationship. In some example welding devices, the amperage adjuster controls the amperage of the weld arc to be equal to or greater than the amperage parameter. In some examples, the threshold is a higher voltage than the voltage set point. In some such examples, the threshold is above a voltage range that is conventionally used for gouging operations.

In some examples, the interface is a user interface to receive a user selection of the amperage parameter. In some example welding devices, the interface is a communications interface to receive a selection of the amperage parameter from another device. In some examples, the voltage correction factor includes an amperage-voltage curve.

Disclosed example methods to provide a controlled current to an electrode include determining a voltage set point based on an amperage parameter and a voltage correction factor and adjusting an amperage of welding power generated by a power converter according to a sloping amperage-voltage relationship when the measured voltage is between 18 volts and 40 volts. The adjusting is based on the amperage parameter, the voltage set point, and a measured voltage of the welding power. Some example methods further include setting, when the measured voltage is not between 18 volts and 40 volts, the amperage of the weld current based on the amperage parameter, the voltage set point, and a second amperage-voltage relationship.

Some disclosed example welding devices provide a controlled current to an electrode and include a power converter, a logic circuit, and a storage device. The power converter outputs weld current. The logic circuit is coupled to the power converter, and the storage device is coupled to the logic circuit. The storage device includes machine readable instructions which, when executed by the logic circuit, cause the logic circuit to identify an amperage parameter, and determine a voltage set point based on the amperage parameter and a voltage correction factor. The power converter outputs the weld current based on the amperage parameter and the voltage correction factor. The instructions also cause the logic circuit to compare a measured voltage corresponding to the weld current to a threshold and, when the measured voltage satisfies the threshold, adjust an amperage of the weld current based on the amperage parameter, the voltage set point, and the measured voltage using a sloping amperage-voltage relationship.

Some disclosed welding devices provide a controlled current to an electrode, and include a logic circuit and a storage device coupled to the logic circuit. The storage device includes machine readable instructions which, when executed by the processor, cause the processor to determine a voltage set point based on an amperage parameter and a voltage correction factor and adjust an amperage of welding power generated by a power converter according to a sloping amperage-voltage relationship when a measured voltage of the welding power is between 18 volts and 40 volts. The adjusting is based on the amperage parameter, the voltage set point, and the measured voltage.

Figure 1:
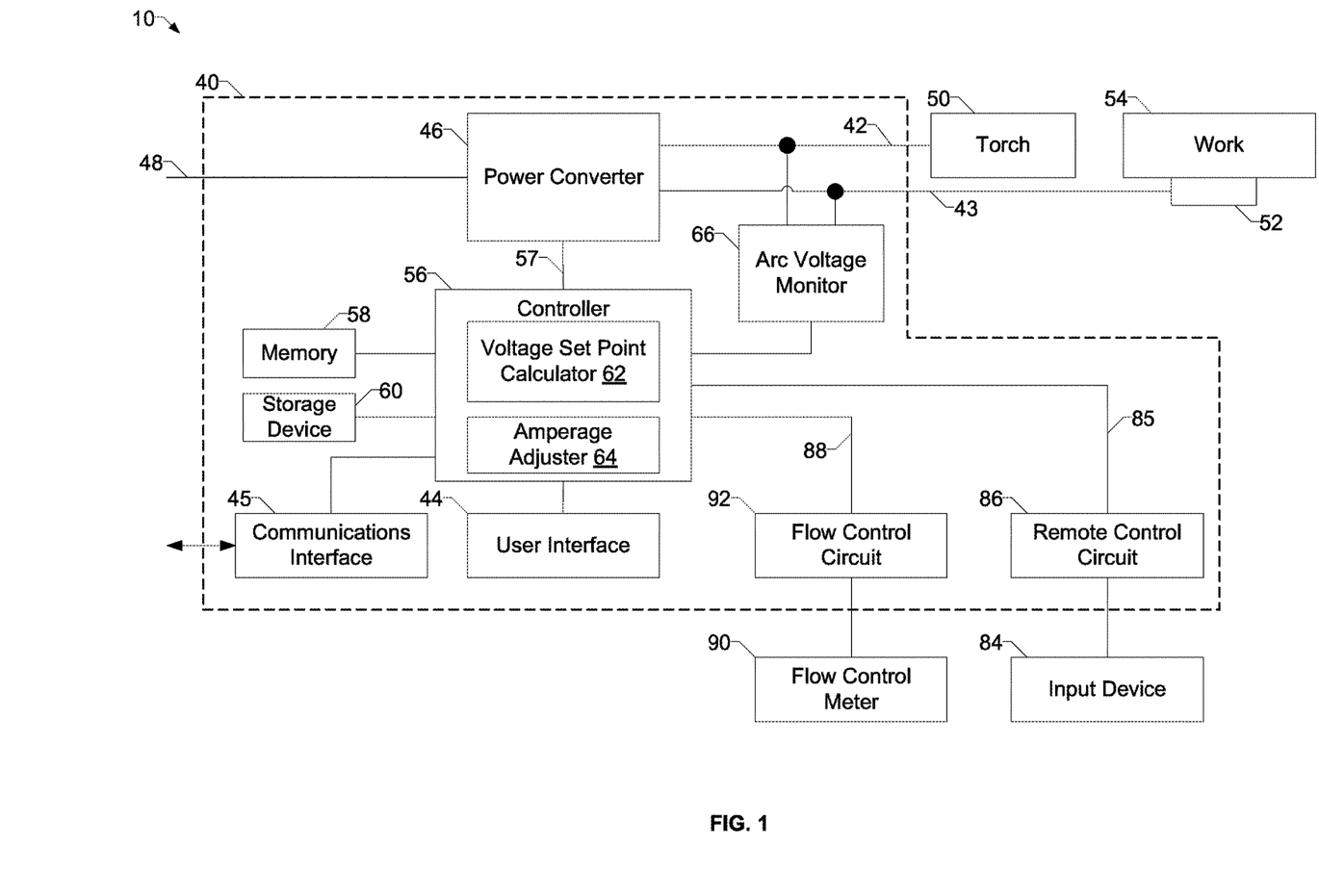
FIG. 1 is a block diagram illustrating an example welding system in accordance with aspects of this disclosure.

FIG. 1 is a block diagram illustrating an example welding system 10 including a power source 40. The power source 40 converts input power to AC and/or DC power suitable for use in gouging operations such as air carbon arc gouging. In some examples, the power source 40 also supports welding operations, such as TIG, stick welding, and/or Submerged Arc Welding (SAW). The power source 40 permits an operator to use the power source 40 for gouging and/or welding by selecting the appropriate operation via a user interface 44, and attaching the appropriate welding equipment, (e.g. a gouging torch and gas supply for air carbon arc gouging, a torch and gas supply for TIG welding, or an electrode holder for STICK welding, etc.).

The power source 40 includes a power converter 46. The power converter 46 receives input power from a power input 48 and converts the power input 48 to either AC and/or DC welding power for output to a torch 50 connected to power outputs 42, 43. In the example of FIG. 1, the torch 50 is connected to the power output 42 and a work clamp 52 is connected to a power output 43 to form an electrical circuit with a workpiece 54 when an electrical arc is started.

The power converter 46 is a phase-controlled power source, which may use silicon controlled rectifiers (SCRs) to convert power received at power input 48 to usable welding and/or gouging power. Additionally or alternatively, the power converter 46 may use DC chopper circuitry and/or any other power conversion topology.

The power source 40 includes a controller 56 that is operatively coupled to the power converter 46. The controller 56 may be implemented using one or more logic circuits, such as one or more "general-purpose" microprocessors, one or more special-purpose microprocessors and/or application-specific integrated circuits (ASIC), field programmable gate arrays (FPGA)s, digital signal processors (DSPs), and/or any other type of logic and/or processing device. For example, the controller 56 may include one or more digital signal processors (DSPs). Alternatively, the controller 56 could include discrete component control circuitry to perform these control functions. The controller 56 controls the output power from power converter 46 by generating control signals 57 to control switching components (e.g., the SCRs) in power converter 46.

The controller 56 receives user-selected operating parameters from user interface 44, such as an amperage (e.g., electrical current) selection. For example, the user interface 44 includes selectors (not shown) operable by the user to select a welding process (e.g., gouging, TIG, STICK, etc.), an amperage control (PANEL/REMOTE), an output control (ON/REMOTE), a start mode (OFF/LIFT/HFSTART/HF-CONT), a positive/negative balance control for AC TIG welding, a DIG control for STICK welding, an amperage level, a spot welding operation, and/or a sequence selection such as start current, final (crater) current, or both. The controller 56 also transmits to the user interface 44 information about the welding operation that is valuable to the welder, including arc voltage, arc amperage, and/or preferred selector settings. The example user interface 44 may include any type of interface device, such as a keyboard, a pointing device (e.g., a mouse, a trackpad), a microphone, a camera (e.g., gesture-based input), a touchscreen, and/or any other type of user input and/or output device.

In some examples, the controller 56 may receive the amperage parameter via a communication interface 45 from another device instead of via the user interface. For example, the controller 56 may receive the amperage parameter via a wired and/or wireless network communication from a computing device (e.g., a computer, a server, a mobile device, cloud storage, etc.), a wired and/or wireless point-to-point connection (e.g., Bluetooth®, near-field communications, etc.), a control cable communication with another welding device, a weld cable communication from another welding device, a communication with a storage device such as a portable storage device (e.g., a FLASH drive or other USB-capable storage, a secure digital (SD) card, etc.), and/or via any other communications method.

A memory device 58 and a storage device 60 are coupled to the controller 56 for storing data including the settings of the selectors on user interface 44 for future retrieval after power-down and/or between welding cycles. The memory device 58 may include a volatile memory, such as random access memory (RAM), and/or a nonvolatile memory, such as read-only memory (ROM). The storage device 60 may include magnetic media such as a hard disk, solid state storage, optical media, and/or any other short and/or long term storage device. The memory device 58 and/or the storage device 60 may store information (e.g., data) for any purpose and/or transmit stored data upon request by the controller 56. For example, the memory device 58 and/or the storage device 60 may store processor executable instructions (e.g., firmware or software) for the controller 56 to execute. In addition, one or more control schemes for various welding processes, along with associated settings and parameters, may be stored in the memory device 58 and/or the storage device 60, along with code configured to provide a specific output (e.g., initiate wire feed, enable gas flow, capture welding current data, detect short circuit parameters, determine amount of spatter) during operation.

The memory device 58 may include a volatile memory, such as random access memory (RAM), and/or a nonvolatile memory, such as read-only memory (ROM). The memory device 58 may store a variety of information and may be used for various purposes. For example, the memory device 58 may store processor executable instructions (e.g., firmware or software) for the controller 56 to execute. In addition, one or more control regimes for various welding processes, along with associated settings and parameters, may be stored in the memory device 58 and/or the storage device 60, along with code configured to provide a specific output (e.g., initiate wire feed, enable gas flow, capture welding current data, detect short circuit parameters, determine amount of spatter) during operation.

When an operator is performing a gouging operation, the arc voltage may vary depending on, for example, the distance between the electrode tip and the workpiece. In some cases, with insufficient power being directed to the electrode, the electrode can be caused to "stub out," or stick to the workpiece. Additionally or alternatively, if inconsistent distances occur between the electrode and the workpiece due to, for example, physical unsteadiness in manipulation of the torch by the operator and/or an inconsistent travel speed can cause the resulting gouging arc to be inconsistent when using conventional power supplies.

The example controller 56 includes a voltage set point calculator 62 and an amperage adjuster 64. The voltage set point calculator 62 set a voltage set point based on the amperage parameter and a voltage correction factor. In some examples, the voltage set point approximates an expected operating voltage of a gouging operation using a selected amperage parameter. The amperage adjuster 64 adjusts an amperage of an arc (e.g., by sending the control signal 57 to the power converter 46) based on a detected voltage of the arc. To this end, the power source 40 includes an arc voltage monitor 66 to measure the arc voltage at the power outputs 42, 43. The arc voltage monitor 66 measures the arc voltage and compares the measured arc voltage to a voltage threshold. Based on the comparison of the measured arc voltage to the voltage threshold, the arc voltage monitor 66 provides an amperage adjustment signal 57 to the amperage adjuster 64.

The amperage adjustment signal 57 may identify one of multiple voltage-amperage relationships to be used by the amperage adjuster 64 to determine an adjustment to the amperage output by the power converter 46. In the example of FIG. 1, the amperage adjuster 64 uses a first voltage-amperage relationship (e.g., a voltage-dependent curve) when the arc voltage is less than the threshold used by the arc voltage monitor 66 and uses a second voltage-amperage relationship (e.g., a voltage-independent curve) when the arc voltage is greater than the threshold. Example voltage-amperage relationships are illustrated in Equations 1 and 2 below.

$$I = I_{set} + 20*(V_{set} - V) \quad \text{(Equation 1)}$$

$$I = I_{set} - 20*(V_t - V_{set}) \quad \text{(Equation 2)}$$

In Equations 1 and 2 above, I is the output amperage determined by the amperage adjuster 64, $I_{set}$ is the amperage parameter received via the user interface 44, $V_{set}$ is the voltage set point identified by the voltage set point calculator 62, and V is arc voltage measured by the arc voltage monitor 66. Equation 1 is based on the amperage parameter, the voltage set point, and the measured voltage, while Equation 2 is based on the amperage parameter and the voltage set point. When the measured voltage V is higher than the threshold, the amperage adjuster 64 uses Equation 1 to adjust the amperage. In contrast, when the measured voltage V is less than the threshold, the amperage adjuster 64 uses Equation 2 to adjust the amperage.

In some examples, the amperage adjuster 64 uses Equation 1 to determine the output amperage only when the measured voltage is at least 18V and is less than 40V. In some examples, the amperage adjuster 64 uses Equation 1 to determine the output amperage only when the measured voltage is at least 24V and is less than 32V. However, the amperage adjuster 64 may use any lower voltage limit (e.g., a lower voltage limit between 18V and 24V) and/or any upper voltage limit (e.g., an upper voltage limit between 32V and 40V) when selecting Equation 1 to determine the output amperage.

The controller 56 also receives remote control inputs 85 from an input device 84 through a remote control circuit 86. The input device 84 is user-operable and can be used to control welding power output. The flow of shield gas and/or gouging gas may also be controlled by controller 56. In this embodiment, a control signal 88 is sent from controller 56 via a path through a flow control circuit 92 to a flow control meter 90. Flow control meter 90 is coupled to a gas supply (not shown) for regulating the flow of shield gas and/or gouging gas from the gas supply to a welding site (e.g., to the torch 50). The flow control meter 90 may be internal or external to the power source 40 with a gas flow channel (not shown) extending from the gas supply, through power source 40, through flow control meter 90, then out to the 50 for provision to the site of the operation. The flow control circuit 92 could also be a submerged arc flux controller or a flux hopper controller.

Figure 2:
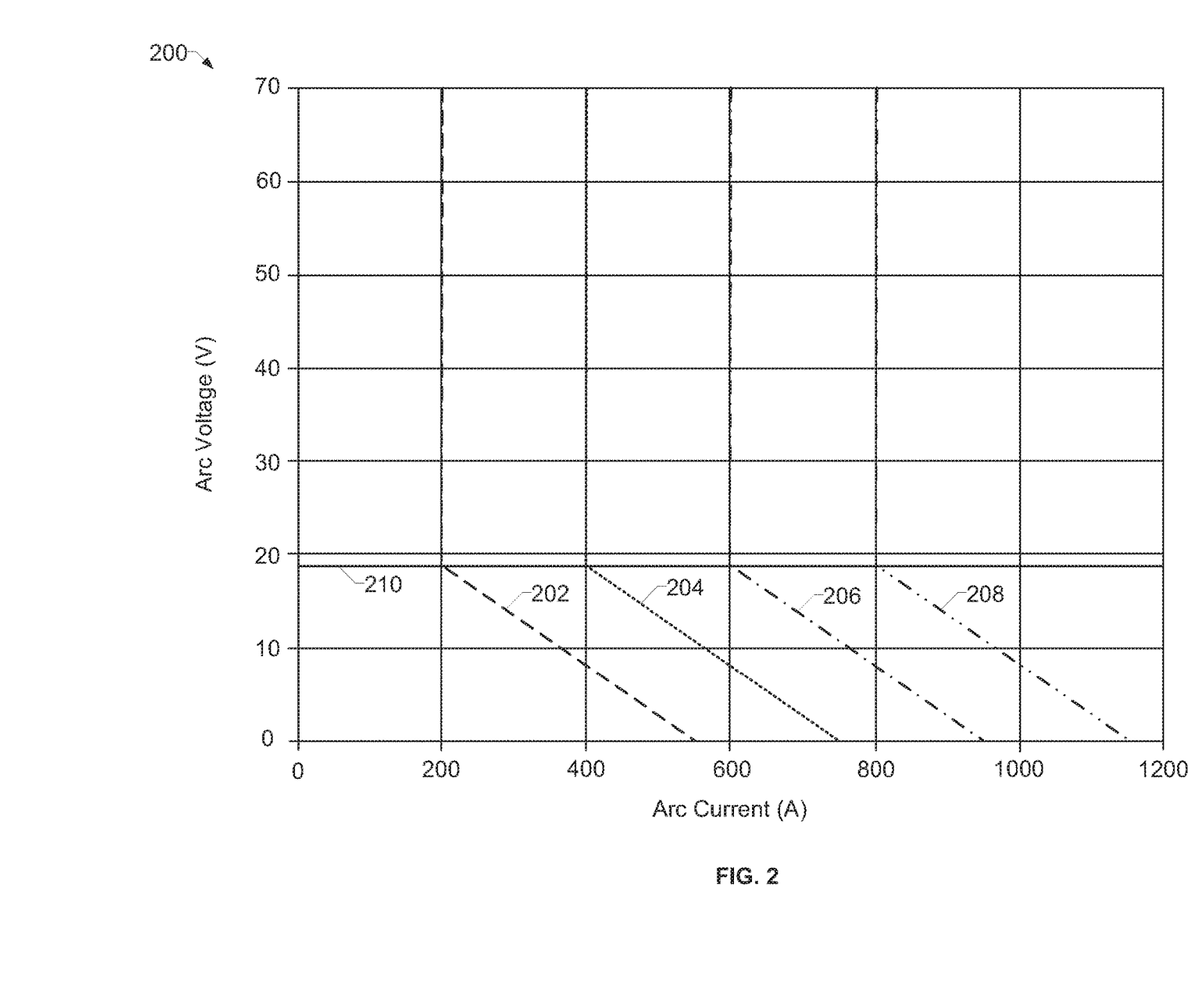
FIG. 2 is a graph illustrating amperage-voltage curves used by a conventional welding system.

FIG. 2 is a graph 200 illustrating amperage-voltage curves 202, 204, 206, 208 used by a conventional welding system. The amperage curves 202-208 correspond to amperage selections by a user, such as 200A, 400A, 600A, and 800A. As illustrated in the amperage curves 202-208, when a voltage decreases below a voltage level 210 (e.g., corresponding to a stuck electrode), the conventional amperage-voltage curves 202-208 causes a conventional power source to increase the amperage as the voltage decreases below the voltage level 210.

Figure 3:
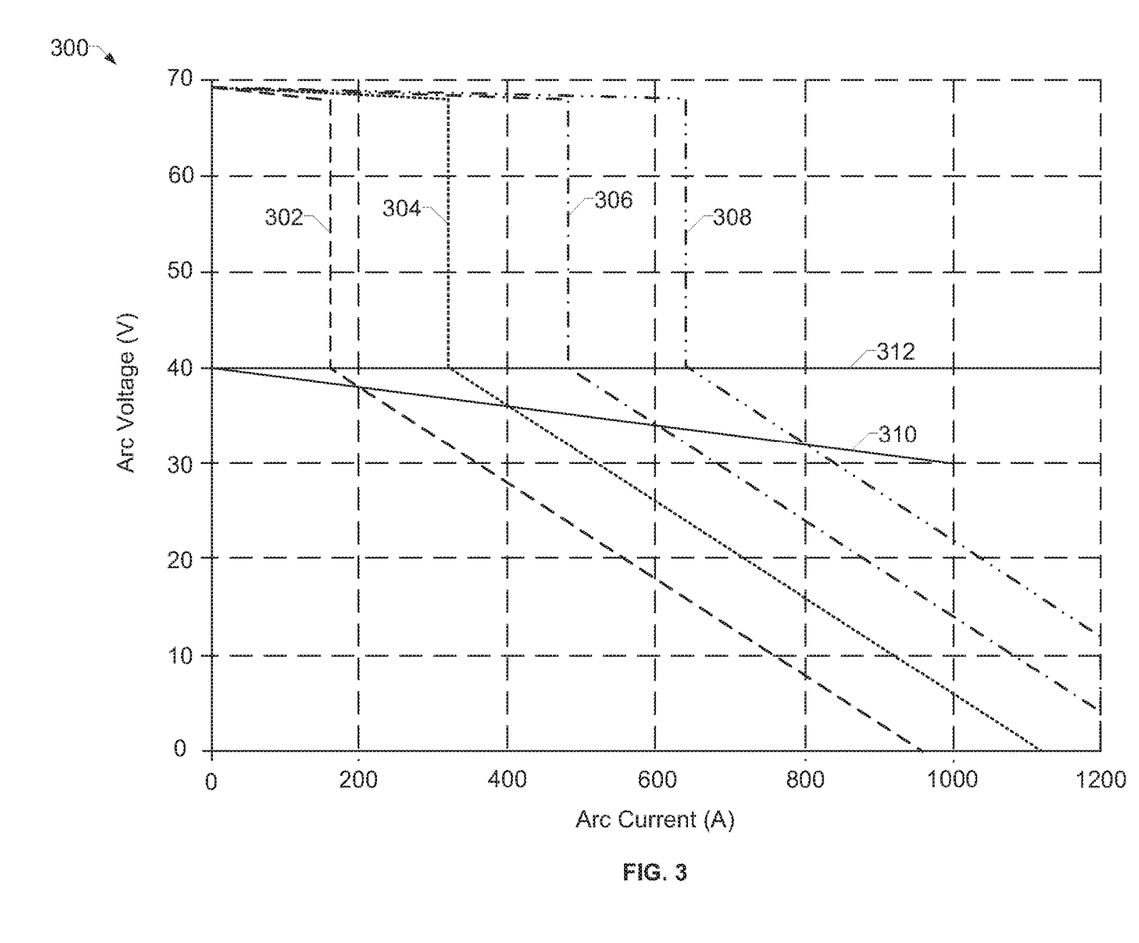
FIG. 3 is a graph illustrating example amperage-voltage curves and an example voltage set point curve used by the example welding system of FIG. 1 to improve the performance of gouging operations.

FIG. 3 is a graph 300 illustrating example amperage-voltage curves 302, 304, 306, 308 and an example voltage set point curve 310 used by the example power source 40 of FIG. 1 to improve the performance of gouging operations. The example amperage-voltage curves 302-308 correspond to amperage selections of 200A, 400A, 600A, and 800A. When a user selects an amperage setting, the example voltage set point calculator 62 calculates a voltage set point along a voltage set point curve 310, such as a voltage at which the voltage set point curve 310 intersects with the correspondence amperage-voltage curve 320-308. The example voltage set point curve 310 corresponds to Equation 3 below, where $I_{set}$ is the selected amperage input to the controller 56 (e.g., via the user interface 44, via the communication interface 45) and $V_{set}$ is the selected voltage set point. In an example, the voltage set point calculator 62 sets a voltage set point of 32V for a selection of 800A (e.g., the amperage-voltage curve 308. As shown in FIG. 3 and Equation 3 below, the voltage set point curve 310 has a negative slope (e.g., the weld amperage has an inverse relationship with the weld voltage).

$$V_{set} = 40 - \frac{I_{set}}{100} \quad \text{(Equation 3)}$$

When the arc starts, the arc voltage monitor 66 measures the voltage. Based on the amperage-voltage curve 308 for the selected amperage, the example amperage adjuster 64 controls the power converter 46 to output an amperage corresponding to the measured voltage. If the measured voltage is below a threshold level 312 (e.g., a threshold higher than the voltage set point level 310, 40V in the example of FIG. 3), the example amperage adjuster 64 uses the example Equation 1. In contrast, if the measured voltage is above a threshold level 312, the amperage adjuster 64 uses the example Equation 2.

While example amperage-voltage curves 302-308 are shown in FIG. 3 for the purposes of illustration, more, fewer, and/or different amperage-voltage curves may be used by the amperage adjuster 64. Further, the example set point curve 310 and/or the example threshold may be the same or different than shown in FIG. 3 based on the particular implementation.

Figure 4:
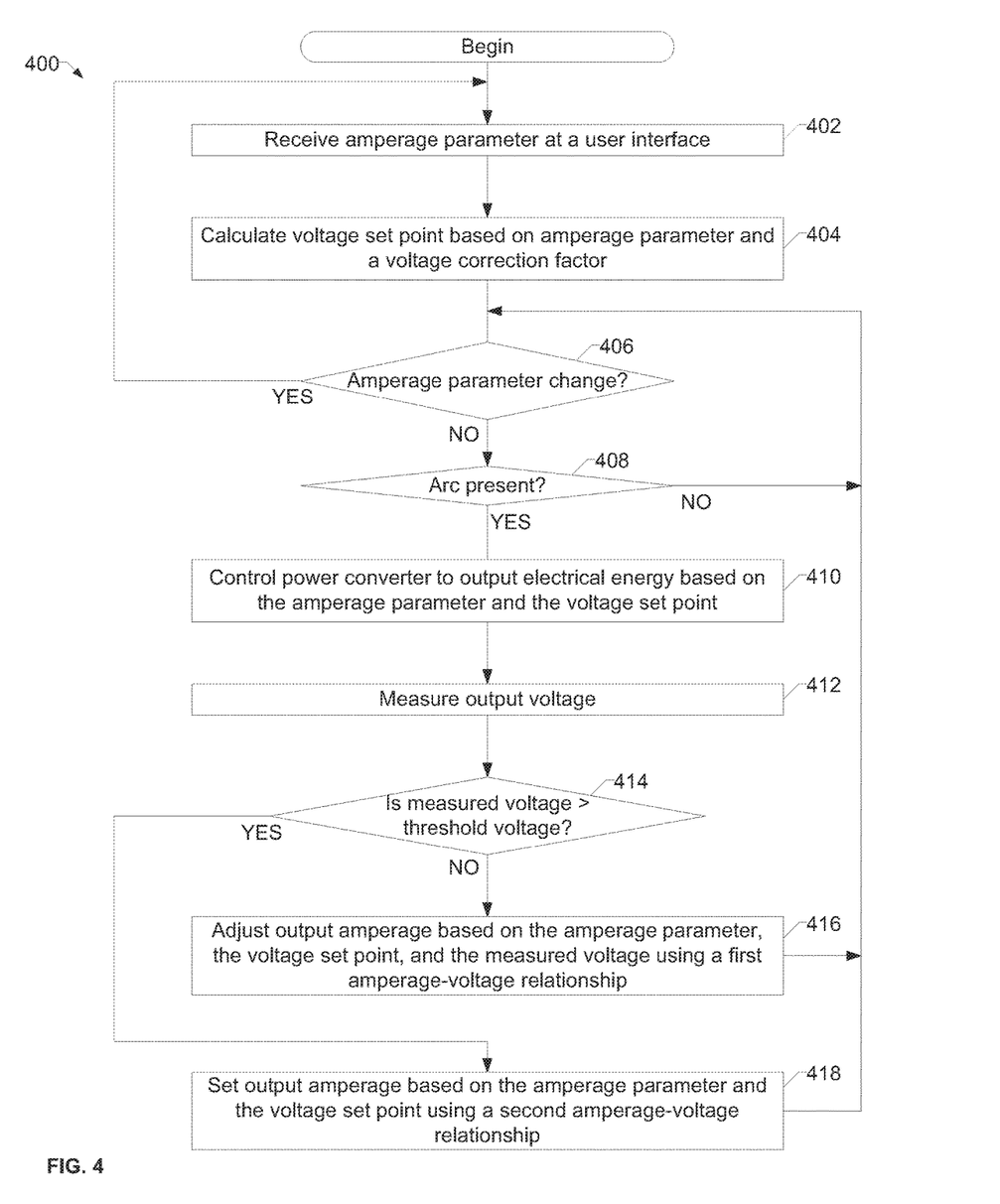
FIG. 4 is a flowchart illustrating an example method which may be implemented by the example power source of FIG. 1.

FIG. 4 is a flowchart illustrating example machine readable instructions 400 which may executed to implement the power source 40 of FIG. 1 to control an amperage output. The instructions 400 may be executed to implement the controller 56, the voltage set point calculator 62, the amperage adjuster 64, the arc voltage monitor 66, and/or the power converter 46.

At block 402, the example voltage set point calculator 62 receives an amperage selection (e.g., an amperage corresponding to one of the curves 302-308. For example, the voltage set point calculator 62 may receive the amperage selection from the user interface 44 and/or from the communications interface 45.

At block 404, the voltage set point calculator 62 calculates a voltage set point based on the amperage parameter and a voltage correction factor. For example, the voltage set point calculator 62 may determine a voltage set point based on the intersection between an amperage-voltage curve (e.g., the amperage-voltage curve 308) and a set point curve (e.g., the set point curve) 310 of FIG. 3.

At block 406, the voltage set point calculator 62 determines whether there has been an amperage parameter change. For example, the voltage set point calculator 62 may identify a change in the amperage selection via the user interface 44 and/or via the communications interface 45. If there is change in the amperage parameter (block 406), control returns to block 402.

If there has not been an amperage parameter change (block 406), at block 408 the controller 56 determines whether the arc is present. For example, the power source 40 and/or the arc voltage monitor 66 may detect the presence of an arc by measuring an output current and/or an output voltage at the power outputs 42, 43, and/or the controller 56 may receive a signal from a trigger of the torch 50. Any other method of determining whether the arc is present may be used. If the arc is not present (block 408), control returns to block 406.

When the arc is present (block 408), at block 410 the controller 56 controls the power converter 46 to output electrical energy based on the amperage parameter and the voltage set point. For example, the amperage adjuster 64 may control the power converter 46 to output a voltage and an amperage corresponding to the selected amperage-voltage curve 308. The output from the power converter 46 may be used to establish and maintain an electrical arc and/or for non-arc welding processes such as hot-wire welding.

At block 412 the arc voltage monitor 66 measures the output voltage. At block 414, the arc voltage monitor 66 determines whether the measured voltage is greater than a threshold voltage. The example threshold voltage used by the arc voltage monitor 66 may be the voltage level 312 of FIG. 3.

If the measured voltage is not greater than the threshold voltage (block 414), at block 416 the amperage adjuster 64 adjusts the output amperage via the power converter 46 based on the amperage parameter, the voltage set point, and the measured voltage using a first amperage-voltage relationship. The example first amperage-voltage relationship may be Equation 1 above and/or the portion of the amperage-voltage curve 308 below the threshold level 312. However, another amperage-voltage relationship may be used based on the application and/or empirical observations.

If the measured voltage is greater than the threshold voltage (block 414), at block 418 the amperage adjuster 64 sets the output amperage via the power converter 46 based on the amperage parameter and the voltage set point using a second amperage-voltage relationship. The example first amperage-voltage relationship may be Equation 2 above and/or the portion of the amperage-voltage curve 308 above the threshold level 312. However, another amperage-voltage relationship may be used based on the application and/or empirical observations.

After adjusting the output amperage (block 416 or block 418), control returns to block 406 to determine whether there has been a change in the amperage parameter.

As illustrated in the instructions 400 of FIG. 4, changing of the amperage parameter may occur while the electrical arc is present and/or is not present. For example, blocks 402-46 may be performed while a gouging operation is occurring.

The present methods and systems may be realized in hardware, software, and/or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may include a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein. As used herein, the term "non-transitory machine-readable medium" is defined to include all types of machine readable storage media and to exclude propagating signals.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

The present methods and/or systems may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A method to provide a controlled current to an electrode, comprising:
    identifying, by circuitry, an amperage parameter of a welding device;
    determining, by a voltage set point calculator, a voltage set point based on the amperage parameter and a voltage correction factor;
    outputting, by a power converter, weld current based on the amperage parameter and the voltage set point;
    comparing, by an arc voltage monitor, a measured voltage corresponding to the weld current to a threshold; and
    adjusting, based on the comparison, by an amperage adjuster an amperage of the weld current based on the amperage parameter, the voltage set point, and the measured voltage.

2. The method as defined in claim 1, wherein:
    when the measured voltage satisfies the threshold, adjusting an amperage of the weld current based on the amperage parameter, the voltage set point, and the measured voltage using a sloping amperage-voltage relationship; and
    when the measured voltage does not satisfy the threshold, adjusting the amperage of the weld current based on the amperage parameter, the voltage set point, and a second amperage-voltage relationship.

3. The method as defined in claim 1, wherein the threshold is a higher voltage than the voltage set point.

4. The method as defined in claim 1, wherein the adjusting of the amperage of the weld current comprises causing the amperage to be greater than or equal to the amperage parameter while the weld current is present.

5. The method as defined in claim 1, wherein identifying the amperage parameter comprises receiving the amperage parameter from at least one of a user interface or a communications interface.

6. The method as defined in claim 1, wherein the voltage correction factor comprises an amperage-voltage curve.

7. The method as defined in claim 1, wherein the voltage correction factor has a negative slope.

8. A welding device to provide a controlled current to an electrode, comprising:
    an interface configured to receive an amperage parameter;
    a voltage set point calculator configured to set a voltage set point based on the amperage parameter and a voltage correction factor;
    a power converter configured to output weld current based on the amperage parameter and the voltage set point;
    an arc voltage monitor configured to compare a measured voltage corresponding to weld current to a threshold; and
    an amperage adjuster configured to adjust, based on the comparison, an amperage of the weld current based on the amperage parameter, the voltage set point, and the measured voltage.

9. The welding device as defined in claim 8, wherein the amperage adjuster is configured to:
    when the measured voltage satisfies the threshold, adjust an amperage of the weld current based on the amperage parameter, the voltage set point, and the measured voltage using a sloping amperage-voltage relationship; and
    when the measured voltage does not satisfy the threshold, adjust the amperage of the weld current based on the amperage parameter, the voltage set point, and a second amperage-voltage relationship.

10. The welding device as defined in claim 9, wherein the amperage adjuster is configured to access a first portion of an amperage-voltage curve to use the sloping amperage-voltage relationship and access a second portion of the amperage-voltage curve to use the second amperage-voltage relationship.

11. The welding device as defined in claim 8, wherein the amperage adjuster is configured to control the amperage of the weld current to be equal to or greater than the amperage parameter.

12. The welding device as defined in claim 8, wherein the voltage set point calculator is configured to set the voltage set point to a voltage equal to or less than the threshold.

13. The welding device as defined in claim 8, wherein the interface comprises a user interface configured to receive a user selection of the amperage parameter.

14. The welding device as defined in claim 8, wherein the interface comprises a communications interface configured to receive a selection of the amperage parameter from another device.

15. The welding device as defined in claim 8, wherein the voltage set point calculator is configured to set the voltage set point using an amperage-voltage curve of the voltage correction factor.

16. The welding device as defined in claim 8, wherein the voltage set point calculator is configured to set the voltage set point using an amperage-voltage curve of the voltage correction factor, wherein the voltage correction factor has a negative slope.

17. A non-transitory machine readable medium comprising machine readable instructions which, when executed, cause a welding device to:
   identify, via circuitry, an amperage parameter of the welding device;
   determine, by a voltage set point calculator, a voltage set point based on the amperage parameter and a voltage correction factor;
   output, by a power conversion circuit, weld current based on the amperage parameter and the voltage set point;
   compare, by an arc voltage monitor, a measured voltage corresponding to the weld current to a threshold; and
   adjust, based on the comparison, by an amperage adjuster an amperage of the weld current based on the amperage parameter, the voltage set point, and the measured voltage.

18. The machine readable medium as defined in claim 17, wherein the instructions are further to cause the amperage adjuster to:
   when the measured voltage satisfies the threshold, adjust an amperage of the weld current based on the amperage parameter, the voltage set point, and the measured voltage using a sloping amperage-voltage relationship; and
   when the measured voltage does not satisfy the threshold, adjust, based on the amperage parameter, the voltage set point, and a second amperage-voltage relationship, the amperage of the weld current.

19. The machine readable medium as defined in claim 17, wherein the instructions are to cause the amperage adjuster to adjust of the amperage of the weld current by causing the amperage to be greater than or equal to the amperage parameter while the weld current is present.

20. The machine readable medium as defined in claim 17, wherein the instructions are to cause the voltage set point calculator to calculate the voltage set point to a voltage equal to or less than the threshold.

21. The machine readable medium as defined in claim 17, wherein the instructions are to cause the circuitry to identify the amperage parameter by accessing the amperage parameter received from at least one of a user interface or a communications interface.

22. The machine readable medium as defined in claim 17, wherein the instructions are further to cause the circuitry to determine that a gouging operation is selected, the voltage correction factor being based on selection of the gouging operation.

* * * * *